United States Patent [19]

Guibert

[11] Patent Number: 4,473,299

[45] Date of Patent: Sep. 25, 1984

[54] GLUTEN PRODUCING SYSTEM

[76] Inventor: Raul Guibert, 10374 Summer Holly Cir., Los Angeles, Calif. 90024

[21] Appl. No.: 359,499

[22] Filed: Mar. 18, 1982

Related U.S. Application Data

[63] Continuation-in-part of Ser. No. 339,186, Jan. 13, 1982, which is a continuation-in-part of Ser. No. 272,344, Jun. 10, 1981, Pat. No. 4,352,567.

[51] Int. Cl.³ .......................... A21C 1/02; B01F 7/16
[52] U.S. Cl. ...................... 366/76; 366/77; 366/86; 366/90; 366/158; 366/169
[58] Field of Search ................. 366/69, 76, 77, 79, 366/81, 82, 87, 90, 98, 134, 137, 138, 155, 156, 157, 168, 169, 172, 173, 293, 295; 426/436, 479, 489, 496, 504; 99/516, 536

[56] References Cited

U.S. PATENT DOCUMENTS

| | | | |
|---|---|---|---|
| 3,375,082 | 3/1968 | Graf | 366/149 |
| 3,687,288 | 8/1972 | Lynch et al. | 366/149 |
| 3,860,220 | 1/1975 | Matsubayashi et al. | 366/86 |
| 3,888,997 | 6/1975 | Guibert | 366/81 |
| 4,352,567 | 10/1982 | Guibert | 366/76 |

Primary Examiner—Harvey C. Hornsby
Assistant Examiner—Michael Knick
Attorney, Agent, or Firm—Michael Ebert

[57] ABSTRACT

A system for producing gluten continuously at a rapid rate, the system including a vertical tube having an inlet at its upper end to receive a flour paste, the lower end of the tube being perforated to define a separation zone surrounded by a water jacket. A rotating shaft coaxially disposed in the tube acts to drive a conveyor screw within the separation zone, the screw having nozzles therein to eject water toward the inner wall of the tube. Keyed to the shaft is a main screw that is spaced from the extruder screw to define a collection zone therebetween, the main screw acting to work the paste fed into the inlet to produce dough which is discharged into the collection zone where it is picked up by the conveyor screw and advanced through the separation zone as a thin dough coil on the inner wall of the tube where it is subjected on one face to water jets from the perforations and on the opposite face to water ejected from the nozzles, thereby dissolving the starch and other soluble components of the dough to produce a milky liquid. The resultant slurry of the gluten and the milky liquid is deposited on a filter to extract the gluten.

8 Claims, 3 Drawing Figures

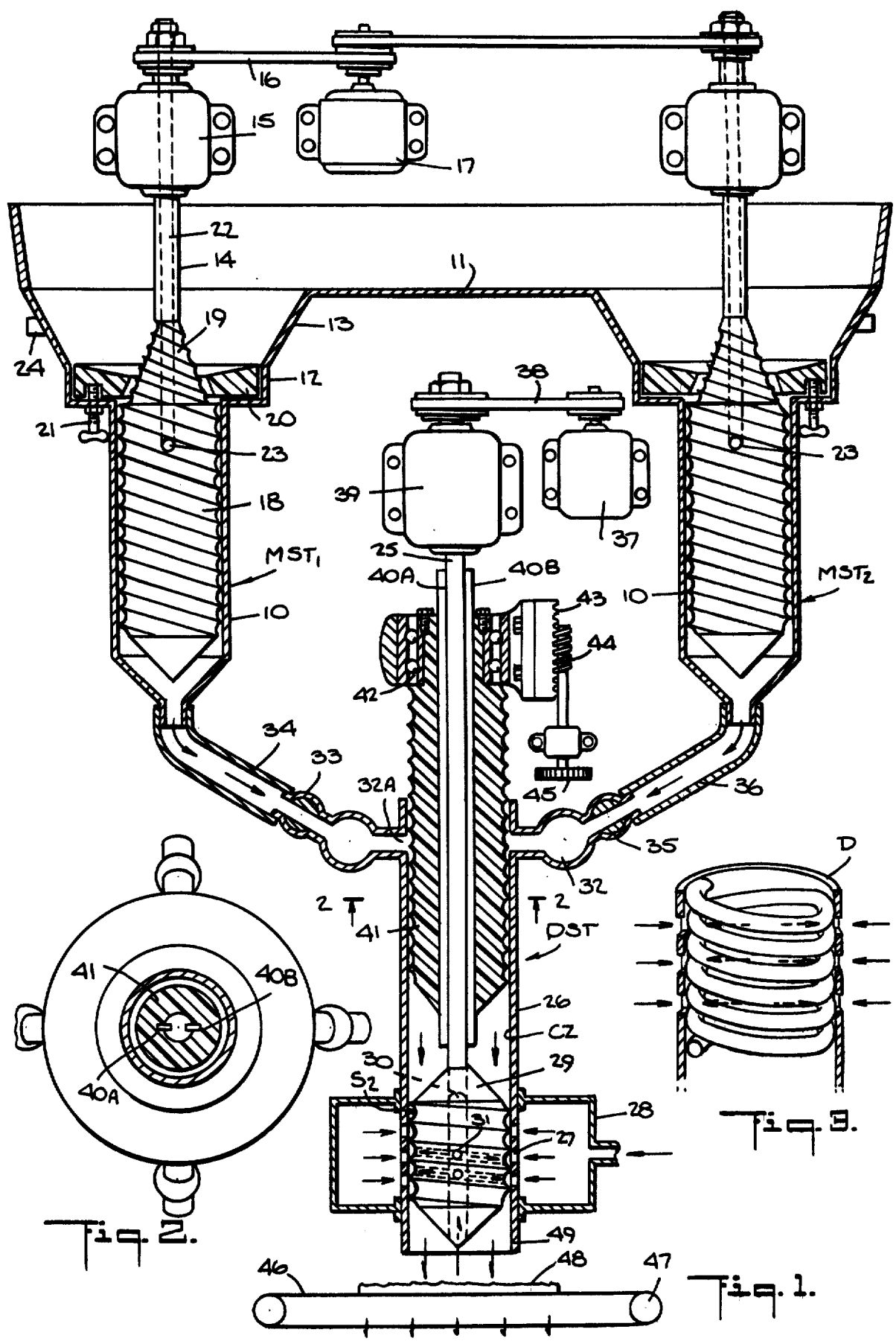

GLUTEN PRODUCING SYSTEM

BACKGROUND OF INVENTION

This invention relates generally to the production of gluten, and in particular to an automatic system which combines wheat flour and water to produce dough and then extracts therefrom the gluten component, all of these actions taking place continuously.

The present invention represents a step beyond the automatic dough-producing systems disclosed in my copending applications in which flour and a dough-producing solution are mixed in a mixer stage to form a paste which is then developed into dough in a developer stage, for in the present invention the dough is supplied to a separator stage in which the gluten is extracted therefrom.

Because of the ever increasing consumption of fabricated and so-called "junk" foods that are notoriously deficient in nutritional value, there has been a concomitant growth in the demand for vegetable proteins with special functional properties. Wheat gluten which possesses a high protein content and unique structural and adhesive properties is the water insoluble complex protein fraction in wheat flours. In its freshly extracted wet state it is known as gum gluten and when thereafter dried it becomes a free-flowing powder of high protein content and bland taste. When gluten powder is rehydrated, it regains its original characteristics.

Wheat gluten is now widely used to fortify breakfast cereals and it is also valuable to bakers, for it acts to strengthen dough, to retain gas and to control expansion, these characteristics resulting in uniformly-shaped baked products. And because gluten absorbs about twice its weight in water, its capacity for holding water gives rise to an increased yield and extended shelf life in many food systems. The useful properties of gluten and its many advantages are set forth in greater detail in the booklet "Wheat Gluten—A Natural Protein for the Future—Today" published in 1981 by the International Wheat Gluten Association—Shawnee, Kans.

The basic procedure for gluten manufacture involves mixing flour with a dough-producing solution to produce a paste which is developed to form dough, the washing of the dough to remove as much of the starch and other soluble flow components as possible, the drying of the gluten to a low moisture content, and finally the reduction of the dried gluten to powder form.

Various techniques are known to separate gluten from starch. Perhaps the oldest is the "Martin process" in which the dough, after hydration, is rolled between fluted rolls and kneaded in a trough with reciprocating rolls under water at high pressure. This action washes away the starch and leaves a mass of gluten.

In the "batter process" developed by the U.S. Department of Agriculture, a soft coherent mass of dough is mechanically broken up in the presence of additional water to yield suspended curds of gluten with the starch removed. The curds are recovered on a gyrating screen through which the starch milk passes. The "Fesca" or direct centrifiguration process results in a well dispersed slurry of flour without gluten development. The starch can be removed from suspension by centrifiguration while the protein remains suspended.

The more recent "Alfa-Laval" gluten extraction process is regarded in an article appearing in the publication "Milling and Baking News" of July 4, 1978 as offering advantages over earlier extraction techniques. This process converts whole wheat into a coarse flour which is mixed with water to form a thick batter. The batter is then homogenized in a disc type unit which discharges a slurry of starch, protein and other flour components. This step is followed by centrifiguration which fractionates the flour into prime starch, B-starch, vital gluten and dried solubles.

The ability to extract insoluble gluten from dough by means of water which dissolves the starch and other soluble components depends on the extent to which the dough is-exposed to the water wash. Thus if the dough is in large mass and the surface of this mass is subjected to water, only the surface region of the mass will have its soluble components removed and the body of the mass will be largely unaffected by the water. While in prior methods, the mass of dough is broken down into smaller globules or pieces, what is still lacking is intimate washing contact between the water and virtually all areas of the dough; hence the resultant gluten is not entirely free of starch or other non-protein components.

Another factor which comes into play is the entrapment of the starch in the gluten. This occurs in the course of development of the paste, for a point may be reached in development where the starch becomes encapsulated in the gluten gum and is thereby insulated from the water later used to dissolve the starch, thereby degrading the quality of the gluten produced by the system.

SUMMARY OF INVENTION

In view of the foregoing, the main object of this invention is to provide an automatic system for producing gluten continuously at a rapid rate.

More particularly, an object of this invention is to provide a compact system of the above type which is efficient and reliable in operation and which has exceptionally high gluten yield.

Also an object of the invention is to provide a gluten producing system in which the degree to which the paste is worked is adjustable to minimize entrapment of the starch in the gluten and thereby optimize the subsequent dissolution of the starch.

A significant advantage of the invention is that the interaction between the water which dissolves the starch and the other soluble components of the dough takes place on both faces of a continuously advancing thin coil of dough, so that virtually all regions of the dough are washed to optimize the gluten yield.

A salient feature of the invention is that the production of dough is not on a batch basis or separate and apart from the production of gluten, for in the continuous system, the input is flour and water which is mixed to produce a paste, the paste being worked to produce a dough which is then washed to extract the gluten, all of these steps taking place without any breaks therebetween.

Briefly stated, these objects are accomplished by a system for producing gluten continuously at a rapid rate, the system including a vertical tube having an inlet at its upper end to receive a flour paste, the lower end of the tube being perforated to define a separation zone surrounded by a water jacket. A rotating shaft coaxially disposed in the tube acts to drive a conveyor screw within the separation zone, the screw having nozzles therein to eject water toward the inner wall of the tube. Keyed to the shaft is a main screw that is spaced from the conveyor screw to define a collection zone therebetween, the main screw acting to work the paste fed into the inlet to a predetermined degree to produce dough which is discharged into the collection zone where it is picked up by the conveyor screw and advanced through the separation zone as a thin dough coil on the inner wall of the tube where it is subjected on one face to water jets from the perforations and on the opposite face to water ejected from the nozzles, thereby dissolving the starch and other soluble components of the dough to produce a milky liquid. The resultant slurry of the gluten and the milky liquid is deposited on a filter to extract the gluten.

OUTLINE OF DRAWINGS

For a better understanding of the invention as well as other objects and further features thereof, reference is made to the following detailed description to be read in conjunction with the accompanying drawings wherein:

FIG. 1 schematically shows a preferred embodiment of a system in accordance with the invention for producing dough derived from flour and dough-forming solution sources; and for extracting the gluten from the dough;

FIG. 2 is a transverse section taken in the plane indicated by line 2—2 in FIG. 1; and FIG. 3 schematically illustrates the manner in which the coil of dough is subjected to jets of water on the inner and outer surfaces thereof to effect separation of gluten.

DESCRIPTION OF THE INVENTION

In my copending application (B) above-identified, dough is produced by means of a screw rotating within a cylindrical chamber having a film-forming zone in which incoming flour particles are centrifigally hurled by the screw against the wall of the chamber to form a thin downwardly-moving flour film which in a succeeding atomizing zone is admixed with a dough-forming solution to produce a paste which in the next zone is subjected by the screw to a kneading action to effect development and thereby produce a dough.

In my copending application (A) above-identified, the mixing stage effects high speed continuous mixing of flour and solution at a controllable rate in one cylindrical chamber, the paste yielded by the mixing stage being supplied to a separately-controllable development stage having its own cylindrical chamber and screw, so that the activity carried out in the mixing and development stages can be optimized independently of each other.

While in the present invention use is made of separate mixing and development stages in an arrangement similar to that disclosed in application B, and gluten separation takes place in an extension of the mixing stage, it is to be understood that the invention is operable with any of the continuous dough-production systems disclosed in applications A and B or in any other system.

Referring now to the figures, there is shown a multistage system in accordance with the invention for mixing flour with water to produce a paste and for working the paste to produce dough which then has its gluten extracted therefrom.

The system includes a pair of vertically-mounted like mixing stages MSt₁ and MSt₂, each in the form of a tube 10 having an inner liner therein to define a processing chamber, the upper end of the tube being joined to a communicating with a metering tube 12 of enlarged diameter. Tube 12 is integral with the cylindrical mouth of a conical main hopper 13. The main hoppers in the two stages are joined to a common flour bin 11. With the exception of the liner, the mixing stage is preferably fabricated of stainless steel or other high strength material that is non-reactive with the ingredients being processed. The liner is preferably fabricated of a low-friction, non-reactive material such as Teflon (PTFE).

Coaxially disposed within main hopper 13 is a rotatable shaft 14 whose upper portion extends thereabove, the shaft being supported by a suitable bearing 15. The shaft is drive by a variable speed motor 17 at a high speed through a belt 16 coupled to a pulley keyed to the motor shaft.

Shaft 14 drives a main screw section 18 of uniform diameter which has a single-helix thread and is disposed within chamber tube 10. Above main screw section 18 is a threaded feeder section 19 which has a conical formation, the feeder section lying within metering tube 12. While feeder section 19 is shown as being threaded, such threading functions only to agitate the flow of flour to prevent agglomeration thereof.

Slidable within metering tube 12 and surrounding feeder section 19 to define an annular valve orifice is a ring 20 whose inlet has a conical formation leading to the orifice. The axial position of ring 20 is settable by means of an adjusting element 21 which may take the form of a lead screw received in a threaded bore adjacent the periphery of the ring. The knob or head of the adjusting element is outside of and below the metering tube, so that the axial position of the ring may be manually set to provide a valve orifice of the desired size.

Shaft 14 is provided with a longitudinally-extending central channel 22 which runs from the upper end of the shaft to one or more radial nozzles 23 bored into the main screw section 18 at a position lying below the junction of feeder screw section 19 and main screw section 18.

Hopper 13 is physically vibrated by a powered vibrator 24 to prevent flour from agglomerating and clogging the hopper. Thus the level of flow in main hopper 13 is maintained as flour is fed into the chamber of cylinder 10 at a rate controlled by the adjusted size of the valve orifice in metering tube 12, the dough-forming solution being concurrently supplied into the chamber.

Since the dough produced by the system is for the purpose of providing gluten and not to make bread, fed into channel 22 is water, not a solution appropriate to bread making.

In operation, flour entering the uppermost flight of main screw 18 in the chamber of tube 10 is directed downwardly into a film-forming zone. Because of the high speed of the screw, the particles of flour are centrifugally hurled outwardly against the surface of inner liner 11 to form thereon a thin, downwardly-moving flour film. Any flour particles coming in contact with the trough surfaces of the flights of main screw 18 will instantly be thrown outwardly at high speed to bombard and admix with the flour film.

Nozzles 23 which eject the water are located in a flight of main screw 18 just below film-forming zone within an atomizing zone. The water is projected from nozzles 23 centrifugally against the flour film emerging from film-forming zone to admix therewith in atomizing zone to produce a pasty, homogenized mass in film form. This pasty film is advanced by the screw down the chamber and is discharged at the lower end of cylinder 10.

The development stage of the system is common to both mixing stages MSt₁ and MSt₂ and includes a rotating shaft 25 coaxially disposed within a tube 26, the lower end portion of the tube having a circumferential array of perforations 27 therein to define a gluten-separation zone SZ surrounded by a water jacket 28. Attached to the end of shaft 25 and rotated thereby in the separation zone is a conveyor screw 29 provided with a central bore 30 communicating with nozzles 31. Means are provided (not shown) to supply water under pressure to bore 30. The jets of water produced by perforations 27 are directed toward screw 29 which water ejected from nozzles 31 in the screw is directed away from the screw which because it rotates acts to produce a swirl of water.

Adjacent the upper end of tube 26 is a toroid housing 32 which surrounds an annular inlet cut in tube 26. One side of housing 32 is coupled via valve 33 and pipe 34 to the outlet of mixing stage MSt₁ so that paste from this stage is supplied to the inlet of the development stage. The opposite side of the housing is coupled via valve 35 and pipe 36 to the outlet of mixing stage MSt₂ so that paste therefrom is also supplied to the inlet of the development stage.

Shaft 25 is driven by a variable speed motor 37 through a belt 38, the shaft being supported by a bearing 39.

Shaft 25 is provided with a pair of opposing keys 40A and 40B which are received in keyways formed in a main screw 41 which is therefore slidable along the shaft. The upper end of main screw 41 is secured to a ball bearing 42 provided at one side with a toothed plate 43 which meshes with the teeth of a lead screw 44 operated by a dial 45 such that when the lead screw is turned in one direction, main screw 41 is raised relative to tube 26 and when turned in the reverse direction it is lowered.

Since the incoming paste is forced down tube 26 by that portion of main screw 41 which lies below paste inlet 32, the higher the main screw is raised relative to the tube, the shorter the operative portion of the main screw and the less the working of the paste. As the main screw is lowered further into the tube, the greater is the working of paste. The ability to adjust the degree of working is an important aspect of the invention, for the working may be set to a level at which the starch in the dough produced in this stage is not entrapped in the gluten and can therefore be dissolved out of the gluten.

The operative portion of main screw 41 produces a dough which is forced into the collection zone CZ in the space defined between the main screw 41 and the conveyor screw 29. Since the rotary speed of main screw 41 is adjustable and the length of the operative portion of this screw can also be adjusted, one can thereby set the degree of working to produce a dough of the desired quality.

Conveyor screw 29 picks up dough from collection zone CZ and forces it into the separation zone SZ where the dough is advanced down the inner wall of tube 26 to create a cylindrical helix or coil of dough D as shown separately in FIG. 3. The outer face of the helix is subjected to jets of pressurized water entering perforations 27 and the inner face is subjected to the centrifugal action of water ejected from nozzles 31. Because of the jet action, the outer face of the coil is separated from the perforated wall of tube 26 and water engages the entire area of this face. It is desirable that the ribbon which forms coil D be thin to enhance its exposure to water. To this end, one may provide a multiple helix for the conveyor screw or increase the rotary speed of the conveyor screw.

As a consequence, the starch and other soluble components of the dough are dissolved in the water and the milky water pours out of the outlet 49 of tube 26. At the same time, the non-soluble gluten component also emerges from the outlet. The gluten and milky water fall onto the upper course of a continuous wire mesh belt 46 of a conveyor having a driven roller 47, the milky water passing through the belt to leave a deposit of gluten 48 thereon. Thus the belt serves as a filter to separate the insoluble gluten from all soluble components of the dough and to transport the gluten away from the system for drying and further processing. The starch in the milky water can be recovered, for this, too, has commercial value.

While there has been shown and described preferred embodiments of a gluten producing system in accordance with the invention, it will be appreciated that many changes and modifications may be made therein without, however, departing from the essential spirit thereof.

I claim:

1. A gluten-producing system operating in conjunction with a mixer which mixes flour and water to produce a paste, said system comprising:
    A. a vertical tube having an inlet adjacent its upper end to receive said paste, the lower end portion of the tube adjacent its outlet being perforated to define a separation zone;
    B. a rotating shaft coaxially disposed in said tube to drive a conveyor screw disposed in said separation zone.
    C. a main screw keyed to said shaft and spaced above the conveyor screw in said tube to define a collection zone, said main screw receiving the paste from the inlet and working the paste to a predetermined degree to produce dough which is discharged into said collection zone and picked up by the conveyor screw which advances the dough in the form of a coil through the separation zone; and
    D. means to supply pressurized water to said perforations, whereby the coil of dough is subjected to water to dissolve the soluble components of the dough to produce a milky water, the resultant gluten and milky water being discharged from said outlet.

2. A system as set forth in claim 1, wherein said conveyor screw is provided with nozzles communicating with a bore, and means to supply pressurized water into said bore which is ejected through the nozzle to subject the inner surface of the coil to water to dissolve said soluble components.

3. A system as set forth in claim 1, wherein said inlet is defined by an annular slot in said tube surrounded by a toroid.

4. A system as set forth in claim 3, wherein said mixer to produce said paste includes a mixing screw rotating within a cylindrical chamber into which is fed said flour and water, the paste output of the chamber being supplied to said toroid.

5. A system as set forth in claim 1, wherein said main screw is axially shiftable relative to said shaft to lengthen or shorten the distance between said inlet and said collection zone and thereby vary the degree to which the paste is worked.

6. A system as set forth in claim 1, further including a water jacket surrounding the perforation in said tube to supply water thereto.

7. A system as set forth in claim 1, further including a wire mesh disposed below the tube to separate the gluten from the milky water.

8. A system as set forth in claim 8, wherein said wire mesh is a continuous belt of a driven conveyor.

* * * * *